United States Patent [19]

Grant

[11] 4,343,630
[45] Aug. 10, 1982

[54] LIQUID DE-GASSING UNIT
[75] Inventor: Anthony Grant, Teddington, England
[73] Assignee: Spikeville Limited, Surrey, England
[21] Appl. No.: 180,403
[22] Filed: Aug. 22, 1980

Related U.S. Application Data
[63] Continuation of Ser. No. 35,546, May 3, 1979, abandoned.

[30] Foreign Application Priority Data
May 9, 1978 [GB] United Kingdom ............... 18578/78

[51] Int. Cl.³ .............................................. B01D 19/00
[52] U.S. Cl. ....................................... 55/170; 55/185; 55/201
[58] Field of Search ..................... 55/36, 41, 159, 164, 55/178, 185, 194, 201, 52, 170, 186; 99/277.1, 277.2, 323.2; 426/475, 477, 486, 487

[56] References Cited

U.S. PATENT DOCUMENTS

| | | | |
|---|---|---|---|
| 621,998 | 3/1899 | Farley et al. | 55/185 |
| 1,119,980 | 12/1914 | Mulligan | 55/201 X |
| 2,088,089 | 7/1937 | McDonald | 55/201 X |
| 3,003,580 | 10/1961 | Lanning | 55/52 X |
| 3,007,919 | 11/1961 | Hoskins | 55/52 X |
| 3,229,445 | 1/1966 | Kraft | 55/164 X |
| 3,273,313 | 9/1966 | Livesey et al. | 55/46 |
| 3,344,587 | 10/1967 | Wakeman | 55/170 |
| 3,359,708 | 12/1967 | Barber | 55/170 |
| 3,713,274 | 1/1973 | Sauer et al. | 55/164 |
| 3,955,945 | 5/1976 | Bauer | 55/185 X |

FOREIGN PATENT DOCUMENTS

| | | |
|---|---|---|
| 362466 | 12/1931 | United Kingdom . |
| 1087722 | 10/1967 | United Kingdom . |
| 1122218 | 7/1968 | United Kingdom . |
| 1232231 | 5/1971 | United Kingdom . |
| 1313916 | 4/1973 | United Kingdom . |
| 1417028 | 12/1975 | United Kingdom . |
| 1426957 | 3/1976 | United Kingdom . |
| 1440190 | 6/1976 | United Kingdom . |

OTHER PUBLICATIONS

Pitstow, Getting Beer to the Glass: Current and Future Treads, Brewing & Distilling International, Jul. 1978, pp. 36, 37 & 45.
Problems of Getting Beer into the Glass, Brewing & Distilling International, Dec. 1979.

*Primary Examiner*—Robert H. Spitzer
*Attorney, Agent, or Firm*—Laurence R. Brown

[57] ABSTRACT

In order to release gas dissolved in a liquid such as beer the liquid is injected as a spray into an agitation chamber having a liquid outlet at one end and a gas outlet at the other end. The gas outlet is controlled by a valve. Electrical contacts are provided within the chamber for monitoring the liquid level therein. When liquid in the chamber rises to a level which covers both contacts the gas outlet valve will be closed and liquid continues to enter the chamber until prevented from so doing by the gas cushion. When the liquid level drops below the electrical contacts the gas valve is opened.

3 Claims, 1 Drawing Figure

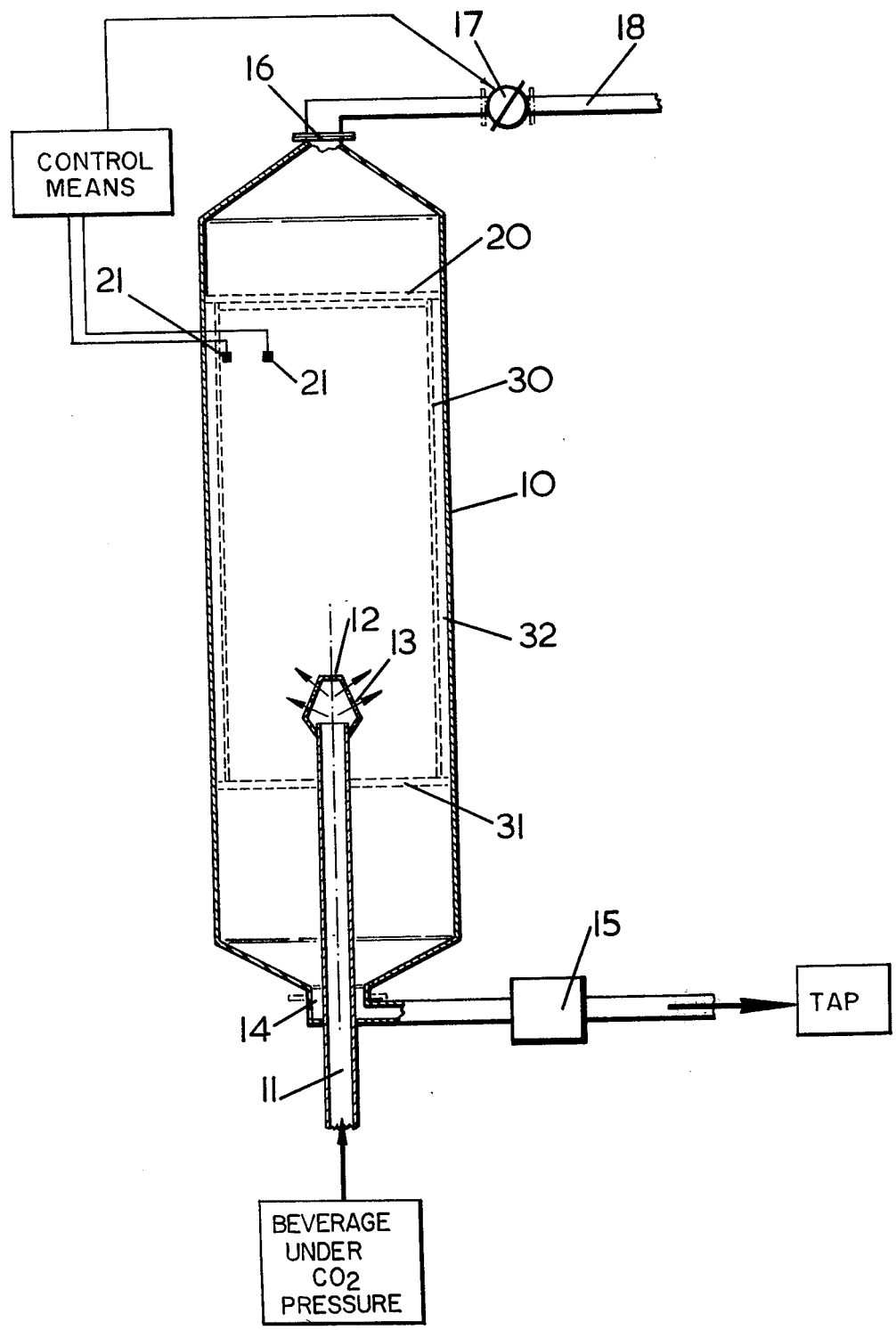

LIQUID DE-GASSING UNIT

This is a continuation of application Ser. No. 35,546, filed May 3, 1979, now abandoned.

This invention relates to a liquid de-gassing unit, for releasing all or a proportion of a gas dissolved in a liquid, such as $CO_2$ in beer.

It is currently a problem in dispensing a gas-containing liquid, particularly lager beer in warm weather, that too much gas come out of solution either at the dispensing tap or in the barrel itself. As a result, the pipe and/or pump leading to the tap can fill with froth (or "fob" as it is called in the beer trade) and it becomes impossible or very difficult to dispense the liquid at all. At best, a small quantity of liquid with a larger quantity of fob appears at the tap.

This problem is well known in the beer trade, since "fobbed" barrels of beer or lager have to be rejected and sent back to the brewers.

The invention aims to provide a simple apparatus for inclusion in the line between barrel and tap to reduce or eliminate the problem.

Accordingly the invention provides apparatus for degassing a liquid comprising an agitation chamber having an inlet for liquid, a liquid outlet at one end and a gas outlet at the other end of the chamber, and a valve controlling the gas outlet.

In the preferred form of the invntion, the liquid inlet has one or more nozzles which cause the liquid to be propelled into the chamber so as to impinge on the walls thereof and/or to strongly agitate liquid already in the chamber.

The agitation of the liquid causes the release of gas which is allowed to escape through the gas outlet at the top of the chamber, while the partially de-gassed liquid is drawn off through the liquid outlet at the bottom.

In order that the invention shall be clearly understood, an exemplary embodiment thereof will now be described with reference to the accompanying drawing, in which apparatus for degassing beer according to the invention is shown schematically.

A cylindrical, preferably transparent, agitation chamber 10 has a liquid inlet 11, for example for lager beer coming from a barrel, which projects about one third of the height into the chamber 10, and terminates in a nozzle head 12. The head 12 has a series of spray openings 13 directed diagonally upwards which allow beer pumped through the liquid inlet 11 to impinge against the inside walls of the chamber. The chamber 10 has a height four to six times its diameter and is tapered at both its upper and lower ends, the lower end terminating in a central liquid outlet 14 which leads to a pump 15. From the pump, the beer is passed to the dispensing tap, not shown.

At the upper end of the chamber, there is a central gas outlet 16 which leads to a normally closed solenoid valve 17 and a vent pipe 18 which vents to atmosphere.

Towards the upper end of the chamber 10, and well above the nozzle head 12, is a permeable wall formed by a condensation gauze 20. The purpose of this gauze is to cause the breakdown of bubbles formed by escaping gas. Mounted in the wall of the chamber 10 a short distance below the gauze 20 are two electrical contacts 21, which operate at low voltage. The contacts are positioned and arranged so as to be sensitive to liquid when the liquid level in the chamber 10 rises so that the contacts are bridged, but to be insensitive to the presence of mere froth.

The apparatus operates as follows; initially, the system is connected up with the liquid inlet 11 connected to the barrel containing beer under $CO_2$ pressure and the pump 15 connected to the dispensing tap. The valve 17 is opened but the dispensing tap remains closed. In these circumstances, beer enters through the liquid inlet 11, emerges as jets through the nozzle head 12 and impinges forcibly on the inside walls of the agitation chamber 10. This releases gas from the beer which forms bubbles which rise in a froth towards the gas outlet 16. The beer, partially de-gassed, flows down the walls of the chamber and steadily fills up the latter. As the bubbles and froth reach the gauze 20, the bubbles are broken and the gas escapes upwards while the beer firming the bubbles coagulates and drops back into the chamber.

As the level of beer in the chamber rises, it covers the nozzle head 12 and the beer coming into the chamber then starts to cause strong agitation of the liquid beer therein. The liquid level continues to rise until it reaches the contacts 21 and when this happens, the electrical control system causes the solenoid valve 17 to be closed. Since the chamber 10 then becomes a closed system, the gas pressure above the liquid in the chamber starts to rise until there is pressure equalisation between that gas and the gas pressure in the barrel forcing the liquid into the chamber. At that point, further inflow of beer ceases, the chamber by then containing a supply of de-gassed beer for transmission to the dispensing tap when required.

Once the dispensing tap is opened, the pump 15 is automatically started to dispense beer which is drawn through the liquid outlet 14 at the bottom of the chamber. This will cause the liquid level in the chamber to drop and the electrical contacts 21 will become uncovered, so that the hold on the valve 17 is released. Thus, the pressure in the top of the chamber 10 as gas is allowed to escape and the pressure from the barrel will cause a fresh flow of beer to start through the liquid inlet 11. It is arranged so that beer will enter at a greater rate than it is drawn off by the pump. The procedure previously followed will then occur again, the level of beer in the chamber 10 rising until it reaches the contacts which will then shut the valve 17 in the gas outlet line 18. This procedure will occur so often as the contacts 21 become uncovered and then covered again by liquid. The result is to maintain a ready supply in the chamber of partially de-gassed beer ready for dispensing to a customer.

It will be seen that the apparatus has no moving parts, and is thus extremely reliable in operation. It is also constructed so as to be easily cleanable, and the chamber itself has no dirt traps which make maintenance difficult.

It should be noted that the presence of a pump is not essential, since the apparatus is constantly tending to produce a closed system with the solenoid valve closed, at which time it becomes pressurised and this pressure is sufficient to dispense the beer from the dispensing tap.

For safety reasons, the system is operated at low voltage. The liquid inlet need not be of the form shown and does not have to come into the chamber centrally at the bottom. It is necessary only that the liquid coming into the chamber should be capable of causing strong agitation of the liquid already in the chamber to ensure that sufficient gas is caused to come out of solution and to escape. The apparatus can be used for other liquids than beer.

If deliveries of more than a pint are envisaged, the chamber will have a proportionately larger volume, and the height may then be less than four times its diameter. Depending on the height, the openings 13 for a head as shown can be directed at any suitable angle above the horizontal.

Though separate contacts 21 are shown, the contacts can be provided by existing metallic members in the chamber, for example the liquid inlet 11 and the gauze 20. Thus as soon as the liquid level reaches the gauze, the electrical circuit would be completed through the liquid. It has also been found that the application of a voltage to or across the gauze can help to breakdown the froth to release the gas.

A modified embodiment of the invention, which can be useful for certain liquids of which a froth will conduct electricity, includes in the chamber an extra solid sleeve 30, shown dotted. The sleeve has a gauze 31 at the bottom and forms an annular sub-chamber 32 up which in use only liquid rises, and not froth. In this case, th contacts 21 are positioned in the sub-chamber 32 and are not closed "falsely" by the column of froth which will rise up inside the sleeve 30, but only "correctly" when the actual liquid level reaches them.

What is claimed is:

1. An apparatus for use in dispensing from a selectively operable tap-like dispensing outlet a carbonated beverage in discontinuous increments and with a minimum of froth comprising, in combination, a storage chamber, said storage chamber being adapted to hold therein when filled to a predetermined level a predetermined volume of carbonated liquid beverage, said chamber having an inlet through which a carbonated liquid beverage enters said chamber, said inlet being located below said predetermined level, said inlet being adapted to be connected exteriorly and said chamber to a container for containing said beverage under gas pressure, said inlet terminating in a nozzle means within said chamber, said nozzle means including at least one discharge opening positioned to direct incoming liquid carbonated beverage from said container into agitating relation to liquid carbonated beverage in said chamber above said nozzle means, said agitating relation being effective to release excess gas from said beverage, a beverage outlet in the lower end of said chamber beneath the level of said nozzle means and adapted to communicate with said tap-like dispensing outlet to permit dispensing from said dispensing outlet beverage having excess gas released therefrom, said beverage being flowable through said beverage outlet of said chamber and through said tap-like dispensing outlet when said tap-like dispensing outlet is open to cause the volume of carbonated liquid beverage in said chamber to drop below said predetermined level, a gas outlet communicating with said chamber above said predetermined liquid level, a valve controlling said gas outlet, and flow control means including liquid level sensing means for opening said valve when liquid beverage in said chamber falls below said predetermined level and for closing said valve when liquid beverage in said chamber rises to said predetermined level, whereby said pressurized beverage flows from said container through said inlet and into said chamber under reduced chamber pressure when said valve is open, and whereby when said valve is closed gas pressure above the liquid in said chamber rises until there is pressure equalisation between said gas pressure and the gas pressure in said container, whereby further inflow of beverage from said container into said chamber ceases when said pressure equalisation is reached.

2. An apparatus as defined in claim 1 in which said discharge opening of said nozzle means is positioned to direct incoming beverage from said container into impinging relation to the inside wall of said chamber when the level of liquid in said chamber is below said discharge opening, said impinging relation being effective to release gas from said incoming beverage.

3. An apparatus as defined in claim 1 in which said nozzle means includes spray openings through which said incoming beverage emerges as jets into said chamber.

* * * * *